A. PENN
Feb. 21, 1933. FLOAT OPERATED SWITCH Re. 18,744
Original Filed May 21, 1928
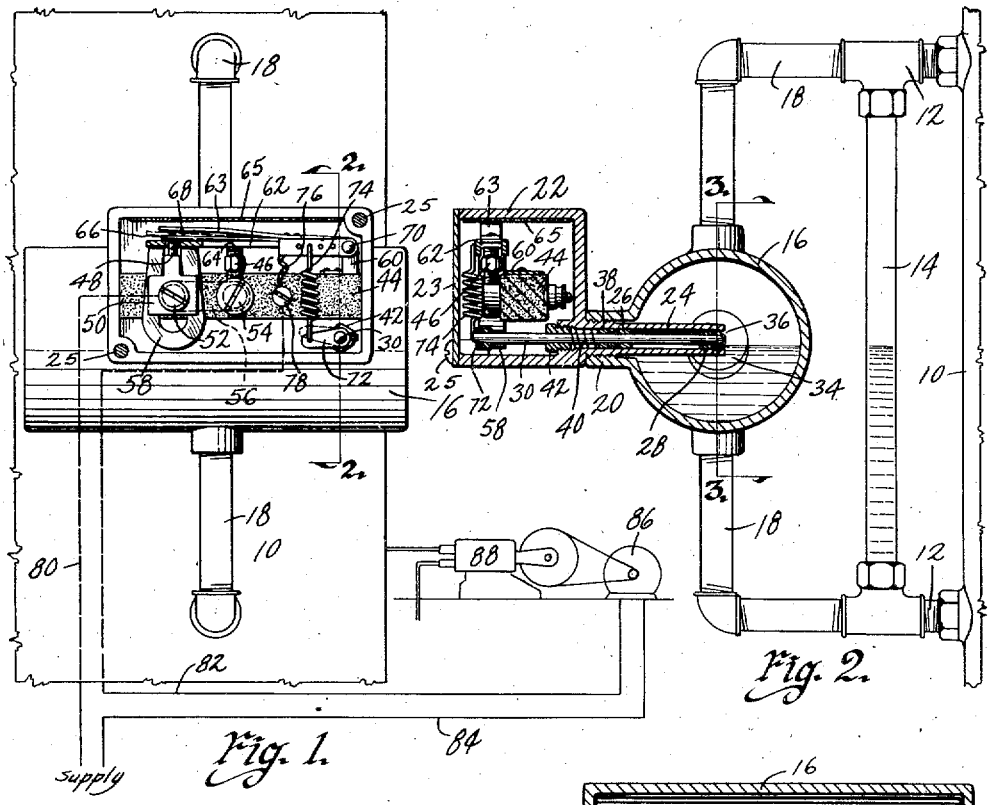
Fig. 1.
Fig. 2.
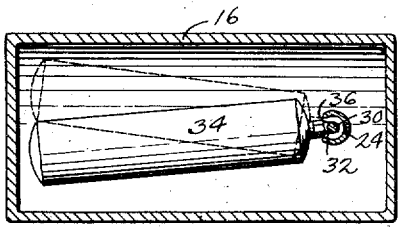
Fig. 3.
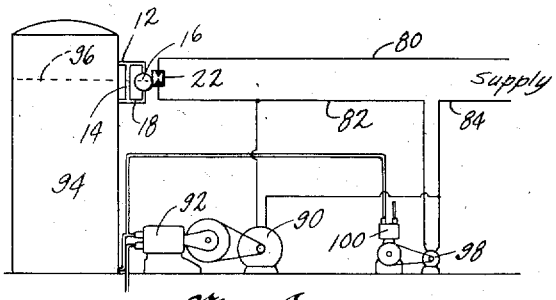
Fig. 4.
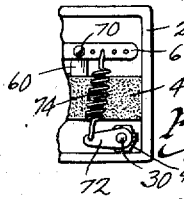
Fig. 5.
Witness
DeBovey
Inventor
Albert Penn
by Bair & Freeman Attorneys Reissued Feb. 21, 1933 Re. 18,744

UNITED STATES PATENT OFFICE

ALBERT PENN, OF DES MOINES, IOWA, ASSIGNOR TO PENN ELECTRIC SWITCH CO., OF DES MOINES, IOWA, A CORPORATION OF IOWA

FLOAT OPERATED SWITCH

Original No. 1,783,448, dated December 2, 1930, Serial No. 279,328, filed May 21, 1928. Application for reissue filed March 16, 1932. Serial No. 599,305.

The object of my invention is to provide an automatic water level controlling structure of simple, durable and comparatively inexpensive construction.

More particularly, it is my object to provide a structure of this character in which a controlling switch is actuated by a float or other actuating mechanism whereby an electric circuit may be either established or broken depending on the level of water influencing the float or other condition influencing the actuating mechanism.

A further object is to provide such a structure in the form of a float housing having a switch housing attached thereto and having a float in the float housing connected to a rock shaft extending into the switch housing which rock shaft is operatively connected to the switch in the switch housing.

Still a further object is to provide a switch in the form of an armature arm having contacts adapted to coact with other contacts mounted stationary in the switch housing and to have a permanent magnet adjacent the armature arm when the contacts are closed.

Still a further object is to provide a resilient connection between a float or other actuating mechanism and the switch so that the magnet will cause a decided snap action of the switch.

Still a further object is to provide a structure of this character for controlling the level of water in either a boiler or a water storage tank by causing the electric circuit to control a motor for pumping water into the boiler or for pumping air into the storage tank.

With these and other objects in view my invention consists in the construction, arrangement and combination of the various parts of my device, whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing in which:

Figure 1 is a side elevation of my structure with the cover removed from the switch housing and showing in diagrammatic form the switch connected to an electric motor for pumping water into a boiler.

Figure 2 is a detail sectional view on the line 2—2 of Figure 1.

Figure 3 is a sectional view on the line 3—3 of Figure 2 illustrating the float housing and the float therein.

Figure 4 is a diagrammatic view showing the installation of my device in a water storage tank system; and Figure 5 is a fragmentary view of the switch illustrating its construction when used as shown in Figure 4.

On the accompanying drawing I have used the reference numeral 10 to indicate a boiler such as a steam boiler in which the level of the water is to be maintained at a certain level. The boiler 10 is usually provided with water gauge connections 12 which are connected together by a glass water gauge 14 in which the level of the water may be observed. In one embodiment of my invention a float housing 16 may be connected by piping 18 around the gauge glass 14 so that the water will also enter the housing 16 for controlling a float. The housing 16 is provided with a boss 20 adapted to support a switch housing 22. The switch housing 22 has a tubular extension 24 threaded into the boss 20 as clearly illustrated in Figure 2.

Pressed into the tube 24 are bushings 26 and 28. Journaled in the bushings 26 and 28 is a rock shaft 30. The rock shaft 30 is bent at right angles as indicated at 32 and is secured to a float 34. The right angled extension 32 extends through a slot 36 formed in the end of the tube 24. The edges of the slot 36 act as a stop for the float 34 both when in a raised position and when in a lowered position.

It will be obvious that water in the housing 16 will affect the float 34 for raising or lowering it, depending on the level of the water. Since there is a pressure in the boiler 10 a packing gland 38 is provided which, in conjunction with the bushing 26 between the two of which packing is mounted, and a spring 40 for holding the packing tight serve as a packing gland. A plug 42 is provided for holding the spring 40 in position.

A bar 44 of insulating material is supported within the switch housing 22 and supports the various parts of the switch. The bar 44 has mounted thereon a main contact 46. An auxiliary contact 48 is also mounted on the bar 44 and these two contacts are connected together by a bracket 50, screws 52 and 54 and a strip of metal 56 as shown in Figure 1, the strip being shown in dotted lines. The bracket 50 also serves to support a permanent magnet 58 on the bar 44.

A bracket 60 is secured to the bar 44 and pivotally supports an armature arm 62. The armature arm 62 is provided with a main contact 64 and with an auxiliary contact 66.

The auxiliary contact 66 can move relative to the arm 62 because of its being secured to one end of a thin leaf spring 68, the other end of which is secured to the arm 62 adjacent the pivot 70 thereof on the bracket 60.

For operatively connecting the rock shaft 30 to the arm 62 a lever 72 is provided which is secured by set screws or other means to the rock shaft 30. The arm 72 is connected by a link 74 formed of resilient material and having a few coils formed in it so that a resilient connection is had. The armature arm 62 is connected by a flexible lead 76 to a terminal screw 78.

*Practical operation*

In the operation of the structure, the water within the housing 16 when raised to a certain height will raise the float 34 causing the arm 72 to assume the dotted line position shown in Figure 1. This raises the armature 62 due to the link connection 74 for opening the switch contacts. The permanent magnet 58 tends to hold the contacts closed and as the arm 72 swings upwardly it will slightly compress the coils of the link 74 until the magnetic field is overcome. Immediately the armature arm will be in a weaker field and the compressed coils of the link will expand causing a quick breaking of the contact. First the main movable contact 64 will disengage the main stationary contact 46 and then the auxiliary contacts 48 and 66 will be separated so that arcing will occur only between the auxiliary contacts. This arcing, however, occurs in a magnetic field which immediately blows it out. It will thus be seen that a snap action switch is had by the use of the permanent magnet 58.

The switch structure in the switch housing 22 is connected by wires 80, 82 and 84 to a source of supply and to an electric motor 86. The motor 86 operates a pump 88 whereby when the float 34 is lowered to a certain predetermined position the switch will be closed quickly because of the armature 62, when entering the field of the magnet 58, being influenced thereby to slightly expand the coils of the link 74 and then to engage the switch contacts with each other whereupon the motor 86 will immediately start to pump water into the boiler 10.

Then after the level of the water has been raised sufficiently to cause the float 34 to open the switch structure, the motor 86 will be automatically stopped. Stopping of the motor is caused by the movement of the float causing the coils of the link 74 to contract until the attraction of the magnet 58 for the arm 62 is overcome whereupon the switch contacts are separated with a decided snap action because of the arm moving through an ever weakening magnetic field and the coils of the link 74 consequently expanding.

In water storage systems as illustrated in Figure 4, a motor 90 and pump 92 serve to pump water into the storage tank 94. This compresses air therein above the water level 96 so that this compressed air serves to drive the water out of the tank and from the faucets connected thereto when they are open. The motor 90 is controlled by the pressure of the tank and forms no part of my present invention.

In a system of this character it is found that the water tends to absorb some of this air so that after a period of operation there is not enough air in the tank for the system to work properly.

It is therefore the practice to provide an electric motor 98 for running a compressor 100 for pumping air into the tank 94 and thereby replenishing the supply of air therein so that normal operation of the system is restored. My device can be applied to a storage tank of this character in the same manner as it is applied to the boiler 10 and may be used to control the motor 98 by reversing the action of the switch. This may be done by reversing the positions of the pivot 70 and the link connection 74 from the arm 72 to the armature arm 62 whereby when the float 34 is raised the switch will be closed and the motor 98 started for forcing air into the tank 94 until sufficient air has been pumped thereinto.

The motors 98 and 90 are connected in parallel and operate from the pressure controlling switch in unison. The pressure controlling switch is of the ordinary type for automatically controlling the pumping motor 92 depending on the pressure of air in the water tank 94. When sufficient air has been supplied to the tank, the float is in the position wherein to cause the air compressor to remain idle.

The arm 62 is preferably provided with a leaf spring stop 63. A strip of insulation 65 prevents grounding of the arm 62 to the casing 22 when the arm is moved to open switch position.

My device allows for extremely close differential of operation between off and on position. This is extremely important in connection with pumps feeding large horizontal boilers.

My device may be used in various installations and I have shown two ways of utilizing it merely for the purpose of illustration. Wherever it is desirable to control an electric circuit by the level of a liquid my device can be installed either with the switch arranged as shown in Figure 1 or as shown in Figure 5.

By providing the switch structure with a magnet as illustrated and a link 74 which resiliently influences the armature to move to either position, a snap action and an arc minimizer result and I am able to carry a considerable amount of current without a relay or pilot circuit. By actual experience, I have found that a switch of this character will work efficiently and satisfactorily for the control of electric motors of sufficient horse power for operating small pumps and air compressors.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An automatic water level controlling structure comprising a float housing, a rock shaft extending therefrom, a float within said housing and secured to said rock shaft, a switch mounted on said housing and including a switch arm, means constantly tending to maintain said switch arm in "on" position and an operative connection between said rock shaft and said switch arm whereby the switch arm may be resiliently moved against the action of said means.

2. A controlling device comprising a switch structure including an armature arm, a contact thereon, a stationary contact adapted to be engaged thereby, a permanent magnet, said armature arm being adjacent the poles of said magnet when said contacts are in engagement, a float and a resilient connector for operatively connecting said float to said armature.

3. A controlling device comprising a switch structure including an armature arm, a contact thereon, a stationary contact adapted to be engaged thereby, a permanent magnet, said armature arm being adjacent the poles of said magnet when said contacts are in engagement, a float, a rock shaft supporting said float and adapted to be rocked thereby and a spring connection between said rock shaft and said armature arm.

4. A controlling device comprising a switch structure including an armature arm, a contact thereon, a stationary contact adapted to be engaged thereby, a permanent magnet, said armature arm being adjacent the poles of said magnet when said contacts are in engagement and a float operatively connected by resilient means to said armature.

5. A controlling device comprising a switch structure including an armature arm, a main contact thereon, a main stationary contact adapted to be engaged thereby, a permanent magnet, said armature arm being adjacent the poles of said magnet when said contacts are in engagement, an auxiliary contact adapted to be engaged thereby upon engagement of the main contact on the arm with the main stationary contact, the engagement of the auxiliary contacts with each other occurring slightly before and their disengagement occurring slightly after, the engagement and disengagement of the main contacts, a float, a rock shaft supporting said float and adapted to be rocked thereby and a spring connection between said rock shaft and said armature arm.

6. A controlling device comprising a switch structure including an armature arm, a contact thereon, a stationary contact adapted to be engaged thereby, a permanent magnet, said armature arm being adjacent the poles of said magnet when said contacts are in engagement, an actuator and a two way resilient connector for operatively connecting said actuator to said armature.

7. A controlling device comprising a switch structure including an armature arm, a contact thereon, a stationary contact adapted to be engaged thereby, a permanent magnet, said armature arm being adjacent the poles of said magnet when said contacts are in engagement and an actuating mechanism operatively connected by a two way resilient means to said armature.

8. A controlling device comprising a switch structure including an armature arm, a permanent magnet, said armature arm being adjacent the poles of said magnet when said armature arm is in closed circuit position, an actuating mechanism and a two way operative connection between said actuating mechanism and said armature arm which resiliently influences said armature arm to move away from said magnet when said actuating mechanism moves in one direction and which resiliently influences said armature arm to move toward said magnet when said actuating mechanism moves in an opposite direction.

9. A device of the character described comprising a control mechanism including an armature arm movable to opposite positions, a permanent magnet, said armature arm being adjacent the poles of said magnet when said armature arm is in one of its positions, an actuating mechanism and a two way operative connection between said actuating mechanism and said armature arm which resiliently influences said armature arm to move away from said magnet when said actuating mechanism moves in one direction and which resiliently influences said armature arm to move toward said magnet when said actuating mechanism moves in an opposite direction.

10. A controlling device comprising a switch structure including a movable armature arm, a contact carried thereby and movable therewith, a stationary contact, a permanent magnet having poles on opposite sides of said stationary contact, said armature arm being adjacent said poles when said first contact is engaged with said stationary contact, an actuating mechanism and a two way resilient means for providing an operative connection between said actuating mechanism and said armature arm.

Executed at Des Moines, in the county of Polk and State of Iowa, this 16th day of February, 1932.

ALBERT PENN.